(12) United States Patent
Möllmann et al.

(10) Patent No.: US 12,391,494 B2
(45) Date of Patent: Aug. 19, 2025

(54) LOADING SYSTEM FOR LOADING AND UNLOADING TRUCKS

(71) Applicant: TRAPO AG, Gescher-Hochmoor (DE)

(72) Inventors: Erik Möllmann, Rhede (DE); Tobias Niehaves, Bocholt (DE); Volker Kugel, Beckum (DE); Stefan Kurtenbach, Schermbeck (DE); Jascha Paris, Münster (DE)

(73) Assignee: TRAPO AG, Gescher-Hochmoor (DE)

( * ) Notice: Subject to any disclaimer, the term of this patent is extended or adjusted under 35 U.S.C. 154(b) by 453 days.

(21) Appl. No.: 17/771,781

(22) PCT Filed: Jul. 22, 2020

(86) PCT No.: PCT/EP2020/070709
§ 371 (c)(1),
(2) Date: Apr. 25, 2022

(87) PCT Pub. No.: WO2021/078417
PCT Pub. Date: Apr. 29, 2021

(65) Prior Publication Data
US 2022/0396441 A1    Dec. 15, 2022

(30) Foreign Application Priority Data
Oct. 25, 2019   (DE) .................. 10 2019 128 916.5

(51) Int. Cl.
*B65G 67/20*   (2006.01)
*B65G 37/00*   (2006.01)
(Continued)

(52) U.S. Cl.
CPC .......... *B65G 67/20* (2013.01); *B65G 37/005* (2013.01); *B65G 47/56* (2013.01); *B66F 9/063* (2013.01); *B65G 13/00* (2013.01)

(58) Field of Classification Search
CPC ........ B65G 67/20; B65G 47/56; B65G 13/00; B65G 15/12; B65G 47/52; B65G 37/005;
(Continued)

(56) References Cited

U.S. PATENT DOCUMENTS

| 4,508,484 A | 4/1985 | Heiz |
| 4,832,559 A | 5/1989 | Gebbardt |
| 7,695,235 B1 * | 4/2010 | Rallis .................. B65G 47/54 |
| | | 414/400 |

(Continued)

FOREIGN PATENT DOCUMENTS

| DE | 3709835 A1 | 10/1988 |
| DE | 9301545 U1 | 4/1993 |

(Continued)

OTHER PUBLICATIONS

Official Communication issued in International Patent Application No. PCT/EP2020/070709, mailed on Oct. 20, 2020.

(Continued)

*Primary Examiner* — Glenn F Myers
(74) *Attorney, Agent, or Firm* — Keating & Bennett, LLP (57) ABSTRACT

A loading system for loading and unloading cargo compartments of trucks includes chain conveyors positioned parallel or substantially parallel to one another and such that standard pallets can be moved back and forth on the chain conveyors in a conveying direction. An autonomous conveyor vehicle is provided as a component of the loading system, and the chain conveyors are positioned at a height above a floor so that the conveyor vehicle with vertically movable pallet fork assemblies can be positioned below the chain conveyors.

17 Claims, 6 Drawing Sheets

(51) Int. Cl.
*B65G 47/56* (2006.01)
*B66F 9/06* (2006.01)
*B65G 13/00* (2006.01)

(58) Field of Classification Search
CPC ........ B65G 67/08; B65G 67/22; B65G 67/24; B65G 47/66; B65G 47/682; B65G 15/10; B65G 13/12; B66F 9/063
See application file for complete search history.

(56) References Cited

U.S. PATENT DOCUMENTS

| | | | | |
|---|---|---|---|---|
| 2005/0053451 | A1* | 3/2005 | Gagnon | B65G 67/20 414/400 |
| 2018/0079607 | A1* | 3/2018 | Shibata | B65G 63/022 |
| 2020/0209865 | A1* | 7/2020 | Jarvis | B66F 9/063 |

FOREIGN PATENT DOCUMENTS

| | | | |
|---|---|---|---|
| DE | 19539563 A1 * | 4/1996 | ............ B65G 67/04 |
| EP | 1 946 963 A1 | 7/2008 | |
| JP | 60-31445 A | 2/1985 | |
| JP | 63-222969 A | 9/1988 | |
| JP | 2018-043879 A | 3/2018 | |

OTHER PUBLICATIONS

Official Communication issued in International Patent Application No. PCT/EP2020/070709, issued on Apr. 26, 2022.

English translation of Official Communication issued in International Patent Application No. PCT/EP2020/070709, mailed on Oct. 20, 2020.

* cited by examiner

LOADING SYSTEM FOR LOADING AND UNLOADING TRUCKS

CROSS REFERENCE TO RELATED APPLICATIONS

This application claims the benefit of priority to German Patent Application No. 102019128916.5 filed on Oct. 25, 2019. The entire contents of this application are hereby incorporated herein by reference.

BACKGROUND OF THE INVENTION

1. Field of the Invention

The present invention relates to a loading system for loading and unloading cargo compartments of trucks.

2. Description of the Related Art

In logistics, the aim is to shorten the downtimes of trucks during loading and unloading by transporting goods on pallets as quickly as possible from a warehouse into the truck's hold. In the present context, truck means the loading space of a truck, which can be designed, for example, as a semitrailer of an articulated truck, as a skip or as a container. For loading and unloading, trucks are usually driven backwards with the rear opening of the loading space to a ramp, where pallets are then provided and transported into the loading space.

One way of loading is to transfer pallets individually into the truck using pallet trucks or forklifts. Rectangular pallets with uniform dimensions are placed next to each other either lengthwise or crosswise. In the case of so-called Euro pallets, three pallets can be placed next to each other lengthwise, i.e., with the narrow sides in the direction of travel of the truck, or two pallets can be placed next to each other crosswise, i.e., with the long sides in the direction of travel of the truck.

German Patent DE 3709835 C2 describes a loading and unloading station for trucks and containers in which pallets are placed in rows of three pallets next to each other on a chain conveyor corresponding to the dimensions of the load compartment floor until the entire load of the truck has been placed on the chain conveyor. The chain conveyor is then moved all the way into the hold, resting on the floor of the truck. The chain conveyor is then started to move the load forward in the direction of truck travel, depositing the front row of pallets at a time. Simultaneously, the chain conveyor is moved backward out of the cargo area at the same speed that the pallets are moved forward on the chain conveyor. As a result, the pallets essentially do not move relative to the loading space and are deposited there one row at a time until the chain conveyor is completely out of the loading space and the last row of pallets has been deposited on the floor of the loading space. In this system, the entire load of the truck is placed on the chain conveyor before the loading process begins. Accordingly, the space required by this system at the ramp of the logistics warehouse is relatively large, and loading the chain conveyor before the loading process into the truck's loading space begins is time-consuming, since loading of the chain conveyor must be completed before the pallets can be moved into the loading space.

From European Patent Publication No. EP 1 946 963 A1, a semi-trailer of a truck is known which is equipped at the bottom of its loading space with chain conveyors arranged in parallel in the longitudinal direction of the semi-trailer. In this case, the chain conveyors are arranged in such a way that a total of three pallets can stand next to each other on the conveyors. For loading, three pallets side by side are placed on the floor of the loading space at the rear and then conveyed forward by the chain conveyor installed in the trailer until the entire loading space is filled. For unloading, the pallets can then be transported back to the opening of the loading space using the chain conveyor and removed there using a forklift. This system requires the respective trailer to be equipped with its own chain conveyor, which extends over the entire length of the loading space and has its own drive. The system is correspondingly complex.

SUMMARY OF THE INVENTION

Accordingly, preferred embodiments of the present invention provide systems for loading and unloading cargo spaces of trucks that are more flexible in handling, that can be implemented without any modifications to the cargo space, and that require less space in the ramp area of the logistics warehouse.

Because in a loading system for loading and unloading cargo compartments of trucks, with an arrangement of chain conveyors positioned parallel or substantially parallel to one another and such that standard pallets can be moved back and forth on the chain conveyors in a conveying direction, there is further provided an autonomous self-propelled conveyor vehicle with at least one steerable wheel as a component of the loading system, and the chain conveyors are positioned at a height above a floor in such a way that the conveyor vehicle with vertically movable pallet fork assemblies can be positioned below the chain conveyors, pallets standing on the chain conveyors can be lifted by the pallet fork assemblies and driven into the loading space of a waiting truck.

If the conveyor vehicle includes three pallet fork assemblies, each with two parallel and spaced pallet forks, three pallets in a row can be picked up and transported side by side.

Preferably, the loading system includes a total of six parallel chain conveyors in three pairs, each pair of adjacent chain conveyors being spaced about 0.5 m to about 0.7 m apart.

If a roller conveyor with rollers with rotational axes aligned transversely to the conveying direction is provided upstream of the chain conveyor in the conveying direction, a number of pallets can be deposited there and, if necessary, aligned before these pallets are transferred to the chain conveyor. For this purpose, it is advantageous if the rollers can be braked and driven at least in part. It is also advantageous to provide an alignment aid parallel to the rollers.

In a preferred embodiment of the present invention, the roller conveyor is equipped with chain conveyors operating transversely to the conveying direction, which are set up to move the pallets on the roller conveyor. In this way, the pallets can be moved closer together and aligned precisely with the downstream chain conveyors in the transverse direction.

Advantageously, measuring columns with sensors are provided to measure a loading space opening that is not part of the loading system so that data on the relative positioning of the loading space opening to the loading system can be determined.

The conveyor vehicle preferably includes at least one drive, at least one lifter and a controller to enable autonomous driving of the conveyor vehicle as well as picking up, transporting and setting down of the load.

For this purpose, the conveyor vehicle itself is preferably equipped with sensors for navigation within a loading space.

For largely autonomous operation, it is advantageous if the conveyor vehicle includes an accumulator to supply power to the drive, the lifter and the controller, which can be electrically charged via an electric coupling or inductively in the loading system. Preferably, charging takes place in a rest position below the chain conveyors.

A particularly high level of operational safety with reduced risk of collision between the pallets and the conveyor vehicle is achieved if the conveyor vehicle does not project upwards above the chain conveyors in a rest or standby position with the pallet fork units lowered.

In a preferred embodiment of the present invention, the loading system is mounted on a base plate which, on the one hand, ensures the exact alignment of the components to each other, but which, on the other hand, can itself be mounted on rollers or on a rail system so as to be movable transversely to the conveying direction. This makes it possible to move the loading system within a logistics building parallel to the ramp to various adjacent gates.

The above and other elements, features, steps, characteristics and advantages of the present invention will become more apparent from the following detailed description of the preferred embodiments with reference to the attached drawings.

BRIEF DESCRIPTION OF THE DRAWINGS

In the following, preferred embodiments of the present invention are described in more detail with reference to the drawings.

DETAILED DESCRIPTION OF THE PREFERRED EMBODIMENTS

Figure 1:
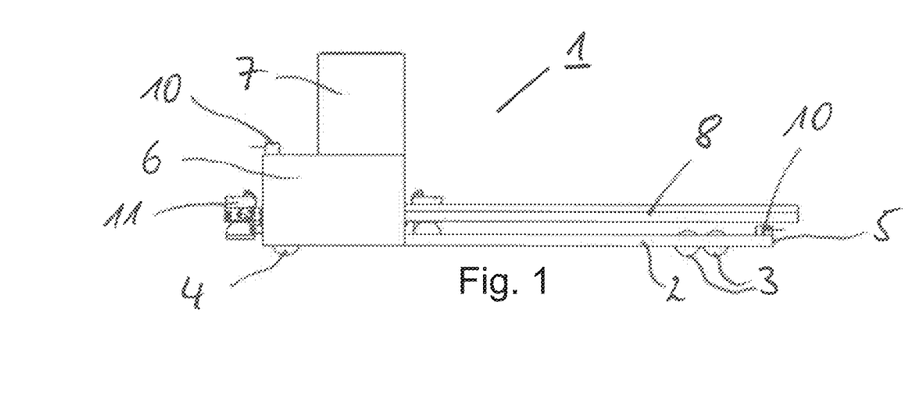
FIG. 1 shows a self-propelled conveyor vehicle for a loading system in a side view with lowered pallet fork units.

FIG. 1 shows a side view of a self-propelled conveyor vehicle 1 as part of the loading system to be described herein. The conveyor vehicle 1 has a chassis 2 with support rollers 3 and steered drive wheels 4, the support rollers 3 being mounted on outriggers 5 facing away from a drive block 6. The drive block 6 includes elements not shown here for control, drive and batteries for energy storage for the operation of the conveyor vehicle 1. In addition, the drive block 6 carries a number of lifting units 7 which are connected to pallet fork units 8 and which are arranged to raise and lower the pallet fork units 8 in response to a control, together with any load thereon. The pallet fork units 8 are shown in FIG. 1 in a lowered condition. The height of the upper side of the pallet fork units 8 above the contact surface corresponds to the clearance height under a standard pallet for logistics.

The conveyor vehicle 1 is also equipped with sensors 10 and additional safety sensors 11, which provide the necessary information for the autonomous navigation of the conveyor vehicle 1. Furthermore, a coupling is provided on the rear side in the direction of travel, which is used to charge the energy storage device when the conveyor vehicle 1 is docked to the loading system in the rest position.

Figure 2:
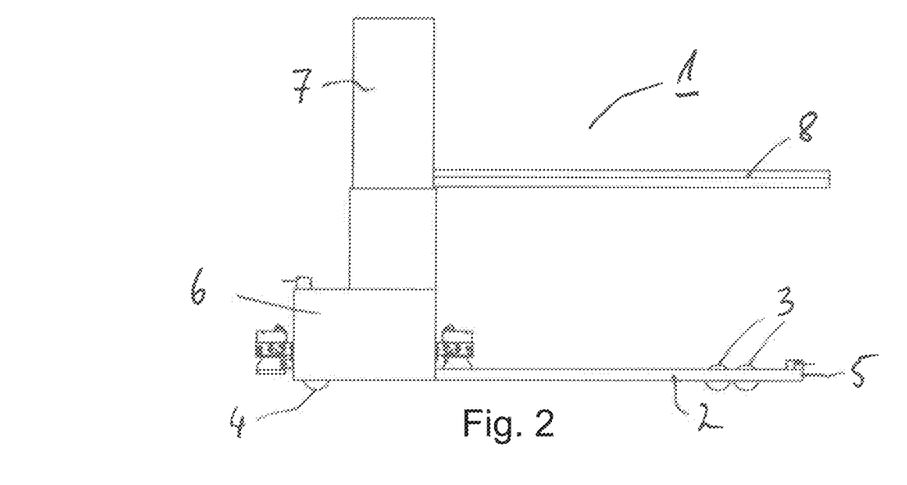
FIG. 2 shows the conveyor vehicle from FIG. 1 with the pallet fork units raised.

In FIG. 2, the conveyor vehicle 1 is shown in a view corresponding to FIG. 1. In FIG. 2, the lifting units 7 are raised together with the pallet fork units 8 attached to them.

Figure 3:
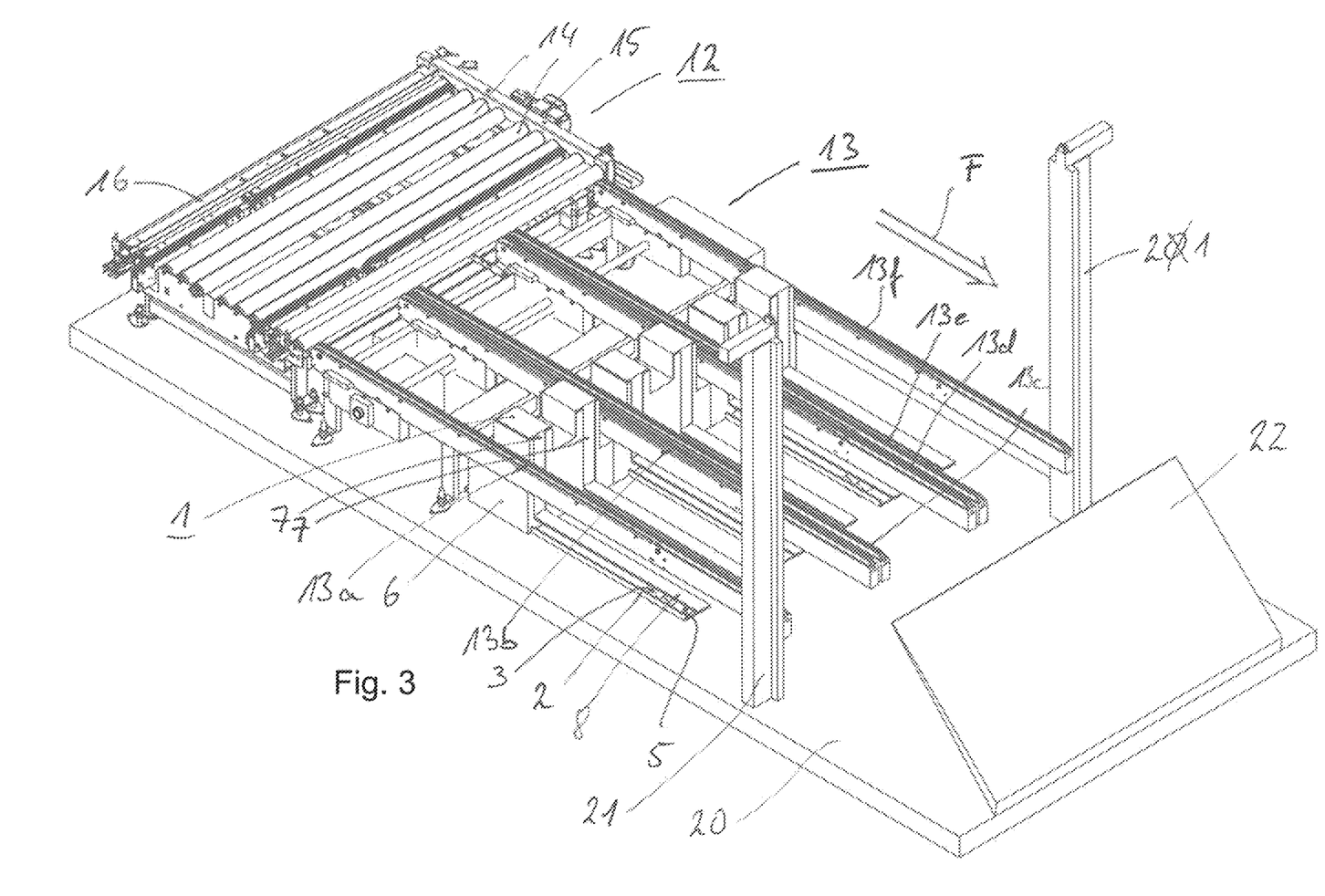
FIG. 3 shows a perspective view of the loading system at rest.

FIG. 3 shows a perspective view of an example of a loading system at rest. The loading system comprises the conveyor vehicle 1 as well as a roller conveyor, which is designated in its entirety by the reference numeral 12, and a chain conveyor arrangement 13 with a number of chain conveyors 13a to 13f. A conveying direction F is indicated by an arrow in FIG. 3. For loading trucks, the load is conveyed in conveying direction F, and for unloading a truck, the load is conveyed in the opposite direction to conveying direction F.

The roller conveyor 12 has a number of rollers 14, the axes of rotation of which are aligned transversely to the conveying direction F. The rollers 14 are at least partially braked and drivable, so that piece goods in the form of pallets can be safely deposited on the rollers 14. Drive means 15 are provided for driving the rollers 14. Further, a rear alignment aid 16 is provided parallel to the rollers 14, which can preferably be raised and lowered during operation. At least two, but preferably three vertically movable chain conveyors are integrated in the roller conveyor 12 in order to be able to regulate the distance between the pallets and to realize a second conveying direction transverse to the conveying direction F.

The chain conveyors 13 are arranged downstream of the roller conveyor 12 in conveying direction F. The chain conveyors 13 are aligned in such a way that they can be driven parallel to the conveying direction F in both directions. Their alignment is such that they can be driven in both directions parallel to the conveying direction F. In detail, a total of six individual conveyor chains 13a to 13f are provided, of which the conveyor chains 13a and 13b are spaced between 0.5 m and 0.7 m apart, so that the total width of the two chain conveyors corresponds to the width of a standard pallet. Conveyor chain 13c is arranged immediately adjacent to conveyor chain 13b. The distance between the conveyor chains 13c and 13d again corresponds to the width of a standard pallet. Conveyor chain 13e is arranged directly next to conveyor chain 13d. Finally, the distance between conveyor chains 13e and 13f again corresponds to the width of a standard pallet. A total of three pallets can therefore be placed on the chain conveyor 13 in the longitudinal direction and transported there in parallel at the same time.

The conveyor vehicle 1 is shown in the rest position below the chain conveyor 13. In this perspective view, it can be seen that the conveyor vehicle 1 consists of a total of three modules, each of which has its own chassis 2 and its own pallet fork unit 8 as well as two lifting modules 7 assigned to the pallet fork unit 8.

The loading system is arranged on a floor, in this case in the form of a base plate 20, which supports a measuring column 21 on the right and left respectively (as seen in the direction of conveyance F). The measuring columns 21 are provided with a number of sensors, not shown in more detail, and are set up to measure the exact position of the loading bay opening as soon as a truck has approached the ramp. Further, the base plate 20 carries a flap 22 which can be folded down in the conveying direction F during operation as soon as a loading space opening is ready. The flap 22 bridges a distance and, if necessary, a height difference between the loading space opening and the base plate 20.

Figure 4:
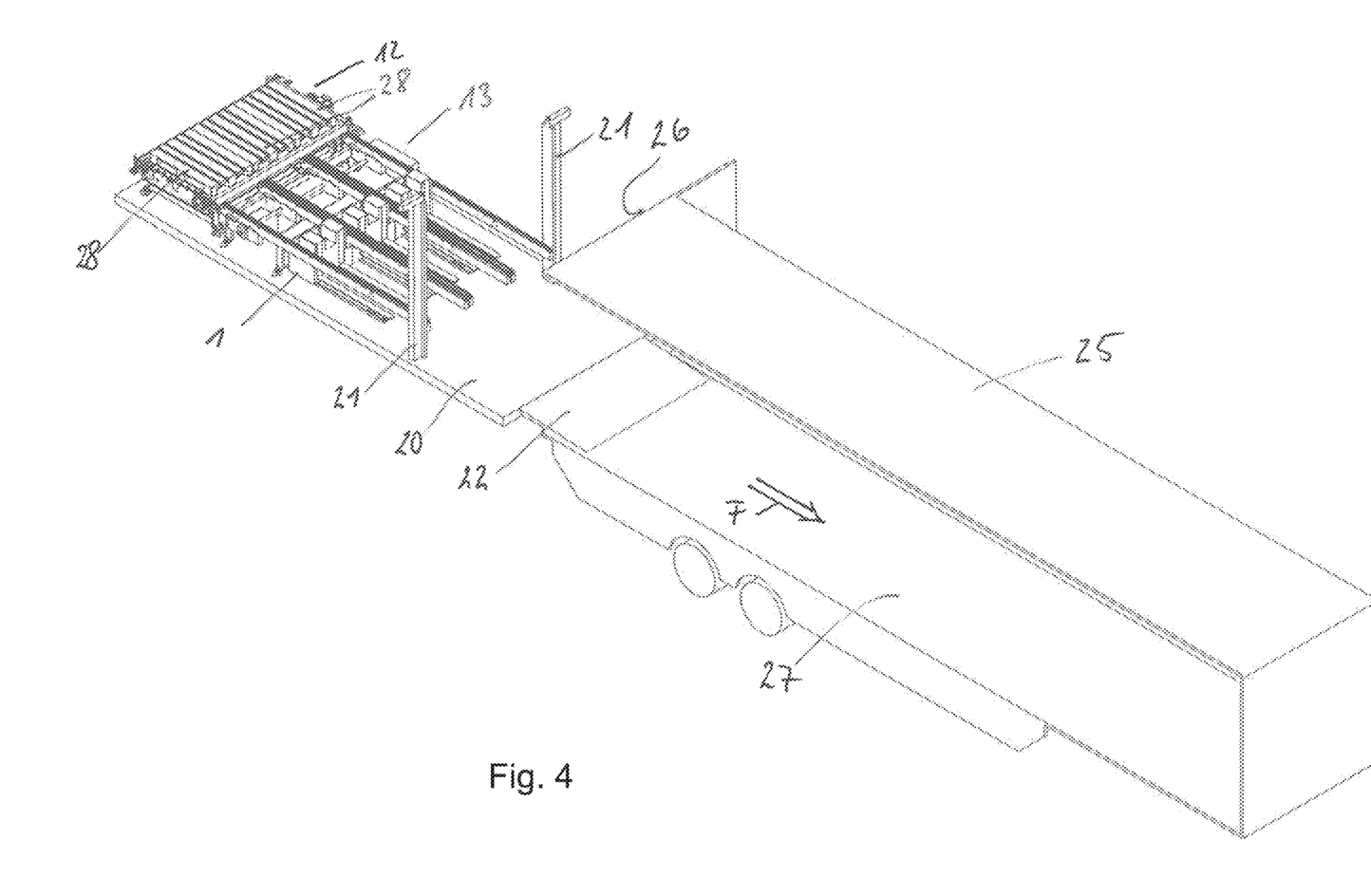
FIG. 4 shows the loading system of FIG. 3 with a row of three pallets put in place and a semi-trailer approaching the loading system with the loading space opening.

FIG. 4 shows the situation already indicated above, in which a semitrailer 25 has been driven by a truck with a loading space opening 26 up to a ramp (not shown) of a warehouse building. The flap 22 is folded down and rests on a loading space floor 27 of the semitrailer 25. In contrast to FIG. 3, the loading process has already begun. For this purpose, three pallets 28 have been placed on the roller conveyor 12 parallel to each other. For alignment in the conveying direction F, the pallets 28 can be moved backwards against the alignment aid 16. The three pallets 28 form a row which is to be conveyed into the loading space of the trailer 25.

Figure 5:
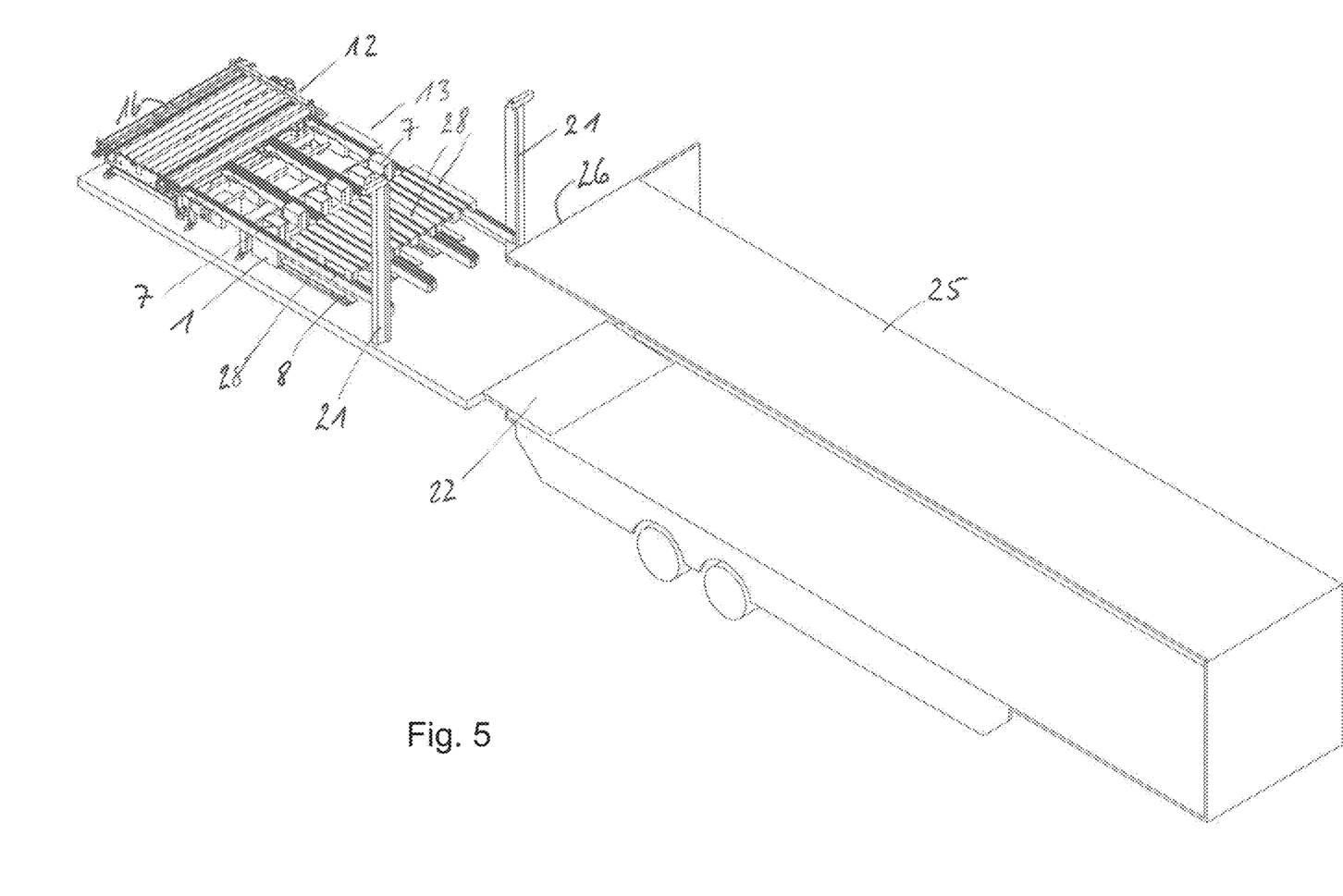
FIG. 5 shows the loading system of FIG. 4, where the row of pallets has been moved towards the trailer.

The next step is shown in FIG. 5. Here, the pallets 28 have first been transferred from the roller conveyor 12 by driving the rollers 14 onto the chain conveyor 13, on which one pallet 28 at a time stands on two spaced chain conveyors as described above. The chain conveyor 13, in turn, has conveyed the pallets 28 in the conveying direction F to such an extent that they stand above the pallet fork units 8 of the conveyor vehicle 1.

The positioning of the pallets 28 on the chain conveyor 13 now allows the pallet fork units 8 of the conveyor vehicle 1 to be lifted by means of the lifting units 7. As is usual with fork trucks or forklifts, the pallet fork units 8 are exactly wide enough to fit into corresponding free spaces on the underside of the pallets 28 and accordingly also between the respective chain conveyors on which the pallets 28 are standing.

The conveyor vehicle 1 can thus lift the pallets 28 from the chain conveyors 13a to 13f by means of the pallet fork units 8. It then carries the load of the three pallets 28 aligned in parallel, which are shown here without the goods being transported on them for the sake of clarity.

Before the conveyor vehicle 1 now autonomously moves off in conveying direction F with the pallets 28 carried by the pallet fork units 8, the sensors of the measuring columns 21 measure the loading space opening 26 and determine the exact position in the transverse direction and in the vertical direction. This information is transmitted to a control system of the conveyor vehicle 1, which is not shown, which can then pointedly approach the loading space opening 26. For this purpose, the steerable drive wheels 4 shown in FIG. 1 are provided, which can precisely steer the conveyor vehicle 1 into the loading space opening 26.

Figure 6:
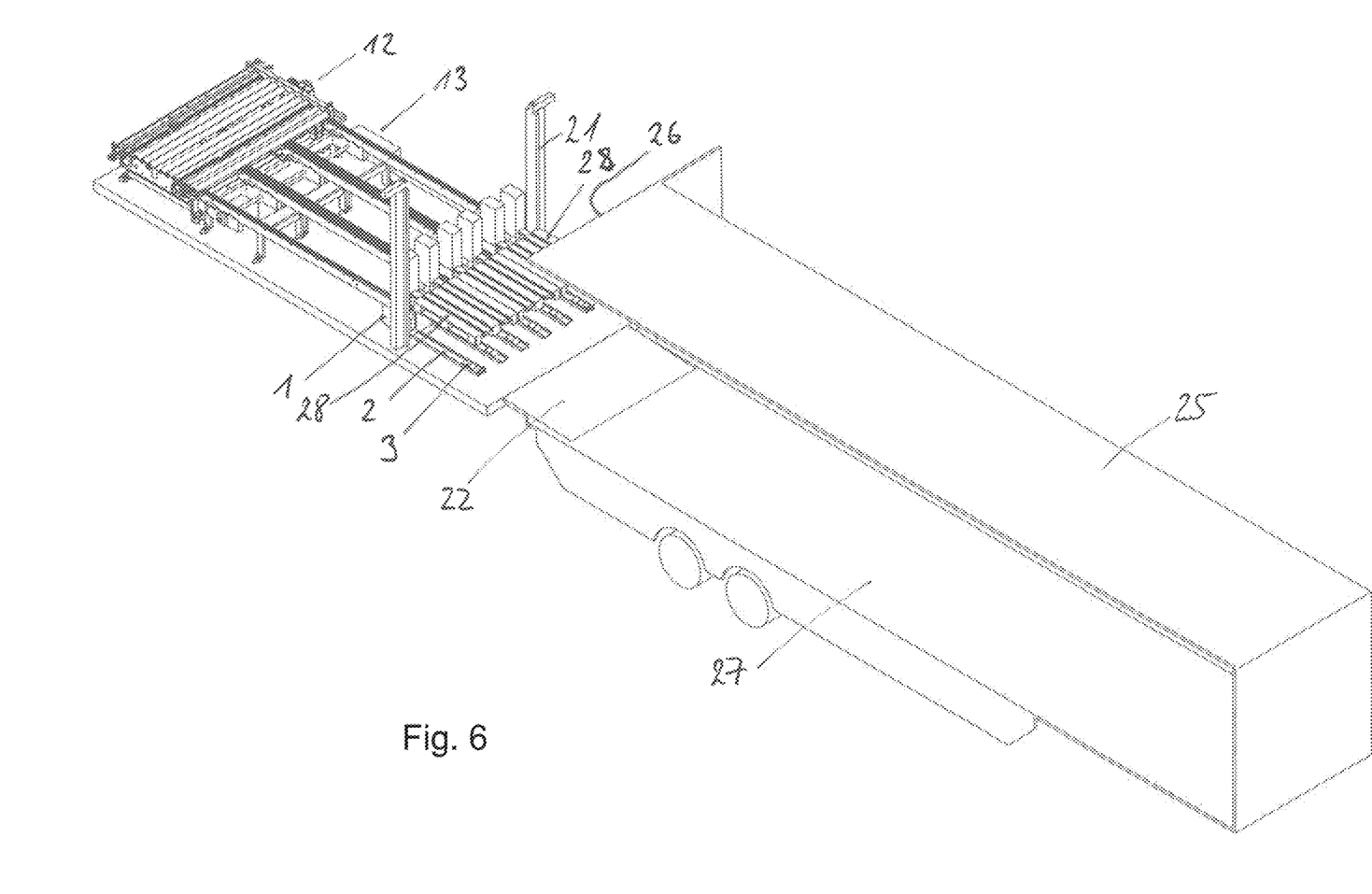
FIG. 6 shows the loading system of FIG. 4 and FIG. 5, in which the pallets have been lifted from the conveyor vehicle and removed from the chain conveyors and moved toward the hold opening.

FIG. 6 illustrates how the conveyor vehicle 1 moves with the pallets 28 removed from the chain conveyors 13 in the direction of the loading space opening 26. The pallet fork units 8 are still raised here.

Before they are moved into the loading area opening 26, the pallet fork units 8 are lowered so that even pallets loaded to the intended maximum height can be moved safely into the loading area opening 26 without hitting the upper edge. In the process, the pallet fork units 8 are lowered to such an extent that the pallets do not yet come into contact with the base plate 20, the flap 22 or the load compartment floor 27. For positioning and navigation within the loading space, the sensors 10 can be read by the control system. Generally, the conveyor vehicle 1 will navigate so that it is centered on the load compartment floor 27 between the side walls of the trailer 25.

Figure 7:
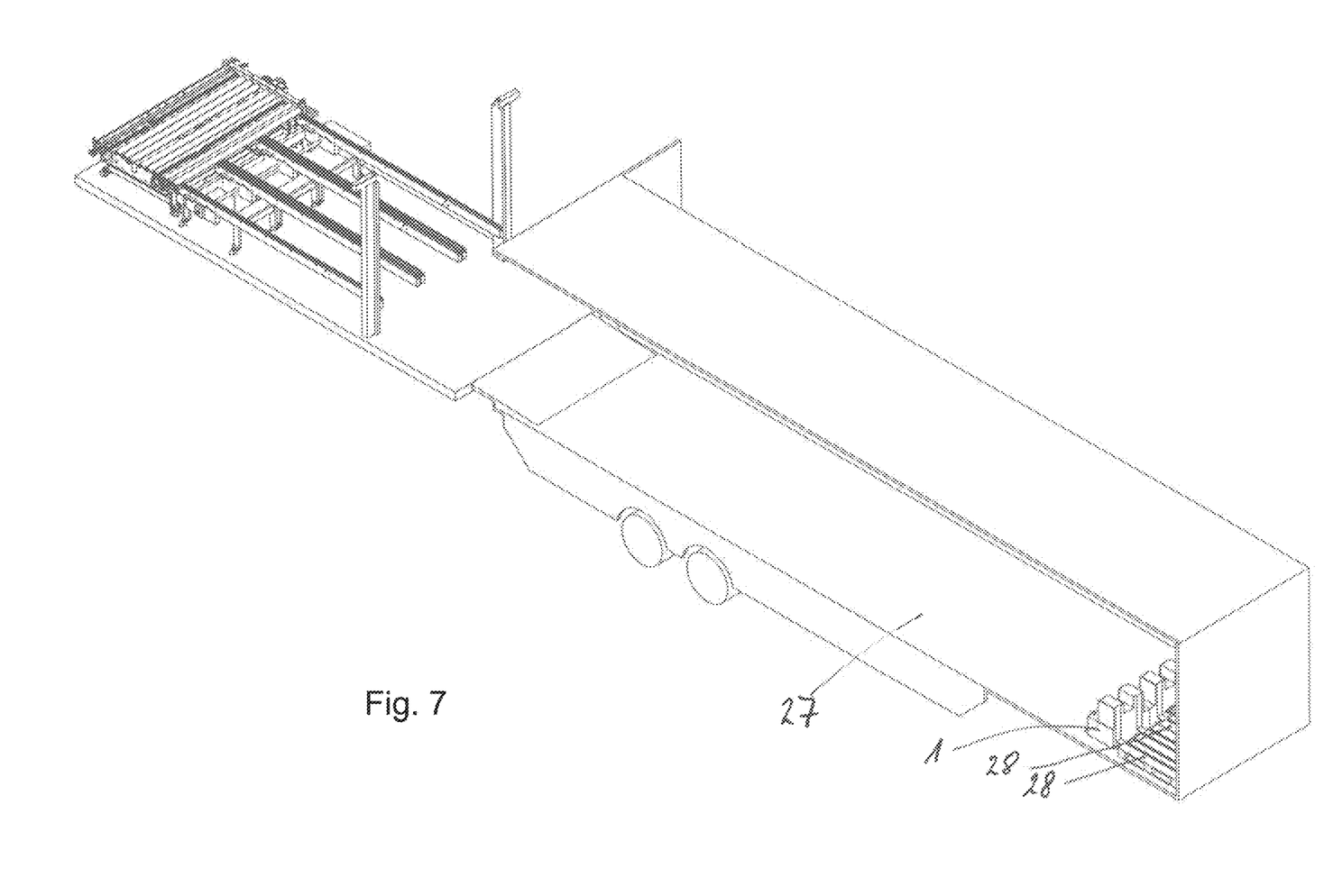
FIG. 7 shows the loading system shown in FIGS. 4 to 6, in which the conveyor vehicle with the three pallets has driven all the way into the loading space of the trailer and deposited the pallets there.

With the pallet fork units 8 lowered, the conveyor vehicle 1 can now drive into the trailer 25 together with the pallets 28 to the end position shown in FIG. 7, where the pallets 28 are then set down for further transport by completely lowering the pallet fork units 8. The pallets 28 then stand on the loading space floor 27. Without the pallets 28, the conveyor vehicle 1 can automatically reverse backwards to the starting position against the conveying direction F.

Once the pallets 28 have been transferred from the roller conveyor 12 to the chain conveyor 13, i.e. from about the position illustrated in FIG. 5, further pallets can be deposited on the roller conveyor 12 until a new row of three pallets is formed. With this new row of pallets, the loading operation described with respect to FIGS. 4 to 7 then continues, with the conveyor vehicle 1 placing the new row of pallets on the loading space floor 27 of the trailer 25 in the conveying direction F immediately behind the rows of pallets 28 already located there. This continues until all pallets have been processed or the loading space of the semitrailer 25 is completely filled.

Unloading of a loaded semitrailer 25 is carried out analogously in reverse order. For this purpose, the conveyor vehicle 1 drives into the filled loading space of the trailer 25, lifts one row of pallets at a time and places them on the chain conveyor 13, from which the pallets are then moved in the opposite direction to the conveying direction F onto the roller conveyor 12, where they can be removed by a forklift truck.

The conveyor vehicle 1 can be charged by means of a corresponding electrical coupling or an inductive charging device in the rest position illustrated in FIG. 3, between the respective trips and in particular also during waiting times between two loading operations.

It can be seen that the new loading system does not require any new installations in the trailer of the truck or in corresponding swap bodies or containers, but can also be used with standard vehicles. It can also be seen that the space required in the warehouse building in the ramp area is significantly less than with systems in which the entire load of usually 11×3 pallets has to be positioned on a conveyor system and then conveyed together into the loading space.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A loading system for loading and unloading cargo spaces of trucks, the loading system comprising:
    chain conveyors positioned parallel or substantially parallel to each other and such that pallets can be moved back and forth on the chain conveyors in a conveying direction; and
    an autonomous conveyor vehicle with at least one steerable wheel is provided; wherein
    the chain conveyors are positioned at a height above a floor, so that the autonomous conveyor vehicle with vertically movable pallet fork assemblies can be positioned below the chain conveyors.

2. The loading system according to claim 1, wherein the conveyor vehicle includes three pallet fork assemblies each having including parallel and spaced pallet forks.

3. The loading system according to claim 1, wherein a total of six parallel chain conveyors are provided such that adjacent pairs of the chain conveyors are spaced at a distance of about 0.5 m to about 0.7 m from one another.

4. The loading system according to claim 1, wherein a roller conveyor including rollers having axes of rotation aligned transversely to the conveying direction is provided upstream of the chain conveyor in the conveying direction.

5. The loading system according to claim 4, wherein the roller conveyor includes chain conveyors operating transversely to the conveying direction to transfer the pallets on the roller conveyor.

6. The loading system according to claim 4, wherein at least a portion of the rollers are capable of being driven and braked.

7. The loading system according to claim 4, wherein an alignment aid is parallel to the rollers.

8. The loading system according to claim 1, wherein measuring columns with sensors to measure a loading space opening not belonging to the loading system are provided.

9. The loading system according to claim 1, wherein the conveyor vehicle includes at least one drive, at least one lifter and a controller.

10. The loading system according to claim 1, wherein the conveyor vehicle includes sensors to assist with navigation within a loading space.

11. The loading system according to claim 9, wherein the conveyor vehicle includes an accumulator to supply power to the at least one drive, the lifter and the controller, and the accumulator is electrically chargeable via an electrical coupling or inductively in the loading system.

12. The loading system according to claim 1, wherein the conveyor vehicle does not project beyond the chain conveyors in a rest position below the chain conveyors.

13. The loading system according to claim 4, wherein the floor includes a base plate on which at least the roller conveyor and the chain conveyor are mounted.

14. The loading system according to claim 13, wherein the base plate is mounted on rollers or on a rail system so as to be movable transversely to the conveying direction.

15. The loading system according to claim 1, wherein the at least one steerable wheel makes it possible for the autonomous conveyor vehicle to move in directions which are not parallel to the conveying direction.

16. The loading system according to claim 1, wherein the vertically movable pallet fork assemblies are able to remove the pallets from the chain conveyors by raising from a level which is vertically below the chain conveyors to a level which is vertically above the chain conveyors.

17. The loading system according to claim 1, wherein the chain conveyors overlap a portion of the autonomous conveyor vehicle when viewed from vertically above the chain conveyors.

* * * * *